US012670592B2

(12) United States Patent
Lenga

(10) Patent No.: US 12,670,592 B2
(45) Date of Patent: Jun. 30, 2026

(54) METHOD FOR TRAINING A PREDICTIVE MODEL, RECEIVING A TRAINING DATA SET FOR MULTIPLE REFERENCE TOMOGRAMS, AND PROVIDING A PREDICTION MODEL

(71) Applicant: Bayer Aktiengesellschaft, Leverkusen (DE)

(72) Inventor: Matthias Lenga, Kiel (DE)

(73) Assignee: Bayer Aktiengesellschaft (DE)

( * ) Notice: Subject to any disclaimer, the term of this patent is extended or adjusted under 35 U.S.C. 154(b) by 271 days.

(21) Appl. No.: 18/565,422

(22) PCT Filed: May 25, 2022

(86) PCT No.: PCT/EP2022/064302
§ 371 (c)(1),
(2) Date: Nov. 29, 2023

(87) PCT Pub. No.: WO2022/253687
PCT Pub. Date: Dec. 8, 2022

(65) Prior Publication Data
US 2024/0242350 A1     Jul. 18, 2024

(30) Foreign Application Priority Data
May 29, 2021     (EP) ..................................... 21176759

(51) Int. Cl.
G06T 7/00          (2017.01)
(52) U.S. Cl.
CPC .. G06T 7/0012 (2013.01); G06T 2207/10072 (2013.01); G06T 2207/10084 (2013.01); G06T 2207/20081 (2013.01); G06T 2207/20084 (2013.01)

(58) Field of Classification Search
None
See application file for complete search history.

(56) References Cited
U.S. PATENT DOCUMENTS

| 9,378,580 B2 * | 6/2016 | Grady | G06T 7/0014 |
| 2014/0236488 A1 * | 8/2014 | Brown | A61B 6/483 702/19 |
| 2015/0178960 A1 * | 6/2015 | Kondoh | G06T 12/30 378/98.12 |
| 2015/0335390 A1 * | 11/2015 | Gill | A61B 6/032 600/424 |

(Continued)

FOREIGN PATENT DOCUMENTS

EP          3694413 A1     8/2020

OTHER PUBLICATIONS

Dar, S. et al. (2020). "Prior-Guided Image Reconstruction for AcceleratedMulti-Contrast MRI via GenerativeAdversarial Networks," IEEE Journal of Selected Topics in Signal Processing. 14(6):1072-1087.

(Continued)

Primary Examiner — Haris Sabah
(74) Attorney, Agent, or Firm — MORRISON & FOERSTER LLP

(57)          ABSTRACT

The present invention relates to the technical field of producing artificial contrast-enhanced radiological images by way of machine learning methods.

18 Claims, 8 Drawing Sheets

(56) References Cited

U.S. PATENT DOCUMENTS

2021/0153838 A1 * 5/2021 Nien ................... A61B 8/4245

OTHER PUBLICATIONS

Haubold, J. et al. (2021). "Contrast agentdose reduction in computed tomography withdeep learning using a conditionalgenerative adversarial network," European Radiology, 31:6087-6095.

Xie, H. et al. (2021). "Generation of Contrast-Enhanced CT with Residual Cycle-Consistent Generative Adversarial Network (ResCycleGAN)," SPIE, 11595:7 pages.

* cited by examiner (200)

Receiving a
first tomogram — (210)

Receiving a
second tomogram — (220)

Receiving a
third tomogram — (230)

Providing a
prediction model — (240)

Feeding the
tomograms to the
first neural
network — (250)

Receiving an
artificial
tomogram — (260)

Outputting the
artificial
tomogram — (270)

METHOD FOR TRAINING A PREDICTIVE MODEL, RECEIVING A TRAINING DATA SET FOR MULTIPLE REFERENCE TOMOGRAMS, AND PROVIDING A PREDICTION MODEL

CROSS REFERENCE TO RELATED APPLICATIONS

This application is a national stage application under 35 U.S.C. § 371 of International Application No. PCT/EP2022/064302, filed internationally on May 25, 2022, which claims benefit of European Application No.: 21176759.5, filed May 29, 2021.

FIELD

The present invention deals with the technical field of generation of artificial contrast-enhanced radiological images by means of machine learning methods.

BACKGROUND

Radiology is a medical field which deals with imaging for diagnostic and therapeutic purposes.

Whereas X-radiation and films sensitive to X-radiation were formerly primarily used in medical imaging, radiology nowadays includes various different imaging methods such as computed tomography (CT), magnetic resonance imaging (MRI) or sonography.

With all these methods, use can be made of substances which facilitate the depiction or delimitation of certain structures in an examination object. Said substances are referred to as contrast agents.

From their pattern of spreading in the tissue, contrast agents can be roughly divided into the following categories: extracellular, intracellular and intravascular contrast agents.

Extracellular contrast agents refer to low-molecular-weight, water-soluble compounds which, after intravenous administration, spread in the blood vessels and in the interstitial space. After a certain, comparatively short period of circulation in the blood circulation system, they are excreted via the kidneys. The extracellular MRI contrast agents include, for example, the gadolinium chelates gadobutrol (Gadovist®), gadoteridol (Prohance®), gadoteric acid (Dotarem®), gadopentetic acid (Magnevist®), and gadodiamide (Omnican®).

Intracellular contrast agents are taken up into the cells of tissues to a certain extent and subsequently excreted. Intracellular MRI contrast agents based on gadoxetic acid are, for example, distinguished by the fact that they are proportionately specifically taken up by liver cells, the hepatocytes, accumulate in the functional tissue (parenchyma) and enhance the contrasts in healthy liver tissue before they are subsequently excreted via the gallbladder into the faeces. Examples of such contrast agents based on gadoxetic acid are described in U.S. Pat. No. 6,039,931A; they are commercially available for example under the trade names Primovist® and Eovist®. A further MRI contrast agent having a lower uptake into the hepatocytes is gadobenate dimeglumine (Multihance®).

Intravascular contrast agents are distinguished by a distinctly longer residence time in the blood circulation system in comparison with the extracellular contrast agents. Gadofosveset is, for example, an intravascular MRI contrast agent based on gadolinium. It has been used as the trisodium salt monohydrate form (Ablavar®). It binds to serum albumin, thereby achieving the long residence time of the contrast agent in the blood circulation system (half-life in the blood about 17 hours).

However, Ablavar® was taken off the market in 2017. Another contrast agent authorized as blood-pool contrast agent for magnetic resonance imaging is not commercially available. Similarly, a contrast agent authorized as blood-pool contrast agent for computed tomography is not available on the market.

When generating radiological images with a comparatively long acquisition time/scanning time, for example image acquisition under free breathing of thorax and abdomen to depict the vascular system (e.g., diagnostics for pulmonary embolism under free breathing in MRI), an extracellular contrast agent is eliminated comparatively rapidly from the blood vessel system, meaning that the contrast drops rapidly.

If a field of view is scanned layer by layer in order to generate a plurality of tomograms, the contrast enhancement continuously drops from tomogram to tomogram because of washout of the contrast agent. Layers which were scanned at a later time are depicted with lower contrast in a corresponding tomogram than layers which were scanned at an earlier time.

The present invention attends to this problem.

SUMMARY

The present disclosure provides a method for generating an artificial, contrast-enhanced tomogram, comprising the steps of:

> receiving a first tomogram, wherein the first tomogram represents a first layer within a field of view of an examination object after the administration of a contrast agent,
>
> receiving a second tomogram, wherein the second tomogram represents a second layer within the field of view of the examination object after the administration of the contrast agent, wherein the second tomogram has been generated after the first tomogram,
>
> providing a prediction model, wherein the prediction model has been trained on the basis of a training data set to transfer contrast information from at least one tomogram to another tomogram and to generate an artificial tomogram in the process,
>
> feeding the first and second tomogram to the prediction model,
>
> receiving an artificial tomogram from the prediction model, wherein the artificial tomogram represents the second layer in the field of view, wherein contrast information from the first tomogram has been transferred in the artificial tomogram, and
>
> outputting the artificial tomogram.

Additionally, the present disclosure provides a method for generating an artificial, contrast-enhanced tomogram, comprising the steps of:

> receiving a first tomogram, wherein the first tomogram represents a first layer within a field of view of an examination object after the administration of a contrast agent,
>
> receiving a second tomogram, wherein the second tomogram represents a second layer within the field of view of the examination object after the administration of the contrast agent,
>
> receiving a third tomogram, wherein the third tomogram represents a third layer within the field of view of the examination object after the administration of the contrast agent, wherein the third layer lies between the first and the second layer, wherein the third tomogram is generated after the first and the second tomogram, providing a prediction model, wherein the prediction model has been trained on the basis of a training data set to transfer contrast information from at least two tomograms to one tomogram and to generate an artificial tomogram in the process, feeding the first, second and third tomogram to the prediction model, receiving an artificial tomogram from the prediction model, wherein the artificial tomogram represents the third layer in the field of view, wherein contrast information from the first and the second tomogram has been transferred in the artificial tomogram, and outputting the artificial tomogram.

The present disclosure further provides a method for training a prediction model, comprising the steps of:

receiving a training data set, wherein the training data set comprises a plurality of reference tomograms for each reference object of a multiplicity of reference objects, wherein the reference tomograms represent a field of view of the reference object after the administration of a contrast agent, wherein the reference tomograms comprise at least two tomograms for each reference object: a first reference tomogram and a second reference tomogram, wherein the first reference tomogram represents a first layer within the field of view, wherein the second reference tomogram represents a second layer within the field of view, wherein the second reference tomogram has been generated after the first reference tomogram, training the prediction model, wherein the first and the second reference tomogram are fed to the prediction model during training, wherein the prediction model is trained to transfer contrast enhancement from the first reference tomogram to the second reference tomogram and to generate an artificial tomogram which represents the second layer.

The present disclosure further provides a method for training a prediction model, comprising the steps of:

receiving a training data set, wherein the training data set comprises a plurality of reference tomograms for each reference object of a multiplicity of reference objects, wherein the reference tomograms represent a field of view of the reference object after the administration of a contrast agent, wherein the reference tomograms comprise at least three tomograms for each reference object: a first reference tomogram, a second reference tomogram and a third reference tomogram, wherein the first reference tomogram represents a first layer within the field of view, wherein the second reference tomogram represents a second layer within the field of view, wherein the third reference tomogram represents a third layer within the field of view, wherein the third layer in the field of view lies between the first layer and the second layer, wherein the third reference tomogram has been generated after the first reference tomogram and the second reference tomogram, training the prediction model, wherein the first, the second and the third reference tomogram are fed to the prediction model, wherein the prediction model is trained to transfer contrast enhancement from the first and the second reference tomogram to the third reference tomogram and to generate an artificial tomogram which represents the third layer.

The present disclosure further provides a computer system comprising:

a receiving unit, a control and calculation unit, and an output unit, wherein the control and calculation unit is configured to prompt the receiving unit to receive at least a first and a second tomogram, wherein the first tomogram represents a first layer within a field of view of an examination object after the administration of a contrast agent, wherein the second tomogram represents a second layer within the field of view of the examination object after the administration of the contrast agent, wherein the second tomogram has been generated after the first tomogram, wherein the control and calculation unit is configured to feed the first and the second tomogram to a prediction model, wherein the prediction model has been trained on the basis of a training data set to transfer contrast information from at least one tomogram to another tomogram and to generate an artificial tomogram in the process, wherein the control and calculation unit is configured to receive an artificial tomogram from the prediction model, wherein the artificial tomogram represents the second layer in the field of view, wherein contrast information from the first tomogram has been transferred in the artificial tomogram, and wherein the control and calculation unit is configured to prompt the output unit to output the artificial tomogram.

The present disclosure further provides a computer program product comprising a computer program which can be loaded into a memory of a computer system, where it prompts the computer system to execute the following steps:

receiving a first tomogram, wherein the first tomogram represents a first layer within a field of view of an examination object after the administration of a contrast agent, receiving a second tomogram, wherein the second tomogram represents a second layer within the field of view of the examination object after the administration of the contrast agent, wherein the second tomogram has been generated after the first tomogram, feeding the first and second tomogram to a prediction model, wherein the prediction model has been trained on the basis of a training data set to transfer contrast information from at least one tomogram to another tomogram and to generate an artificial tomogram in the process, receiving an artificial tomogram from the prediction model, wherein the artificial tomogram represents the second layer in the field of view, wherein contrast information from the first tomogram has been transferred in the artificial tomogram, and outputting the artificial tomogram.

The present disclosure further provides for use of a contrast agent in a method for predicting an artificial contrast-enhanced tomogram, wherein the method comprises the following steps:

generating a first tomogram, wherein the first tomogram represents a first layer within a field of view of an examination object after the administration of a contrast agent, generating a second tomogram, wherein the second tomogram represents a second layer within the field of view of the examination object after the administration of the contrast agent, wherein the second tomogram is generated after the first tomogram, feeding the first and second tomogram to a prediction model, wherein the prediction model has been trained on the basis of a training data set to transfer contrast information from at least one tomogram to another tomogram and to generate an artificial tomogram in the process, receiving an artificial tomogram from the prediction model, wherein the artificial tomogram represents the second layer in the field of view, wherein contrast information from the first tomogram has been transferred in the artificial tomogram, and outputting the artificial tomogram.

Further provided is a contrast agent for use in a method for predicting an artificial contrast-enhanced tomogram, wherein the method comprises the following steps:

generating a first tomogram, wherein the first tomogram represents a first layer within a field of view of an examination object after the administration of a contrast agent, generating a second tomogram, wherein the second tomogram represents a second layer within the field of view of the examination object after the administration of the contrast agent, wherein the second tomogram is generated after the first tomogram, feeding the first and second tomogram to a prediction model, wherein the prediction model has been trained on the basis of a training data set to transfer contrast information from at least one tomogram to another tomogram and to generate an artificial tomogram in the process, receiving an artificial tomogram from the prediction model, wherein the artificial tomogram represents the second layer in the field of view, wherein contrast information from the first tomogram has been transferred in the artificial tomogram, and outputting the artificial tomogram.

Further provided is a kit comprising a contrast agent and a computer program product according to the disclosure.

BRIEF DESCRIPTION OF THE FIGURES

The systems, methods, computer program products, and kits provided herein will be described, by way of example only, with reference to the following figures.

DETAILED DESCRIPTION

Figure 1:
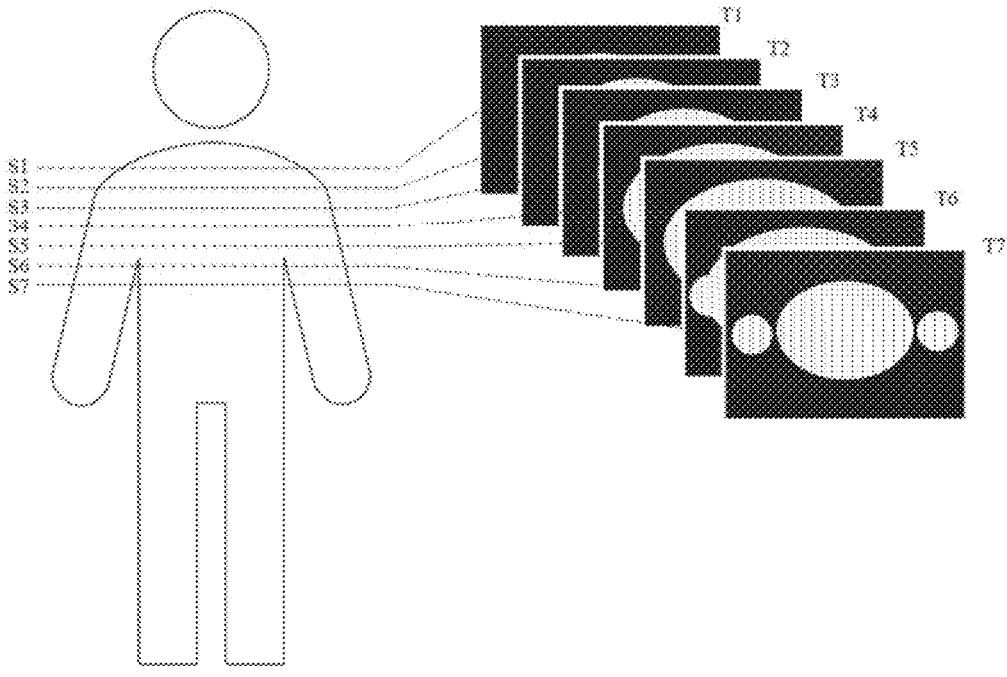
FIG. 1 shows a schematic of a human body that is being subjected to a radiological examination, according to some embodiments.

The invention will be more particularly elucidated below without distinguishing between the subjects of the invention (method, computer system, computer program product, use, contrast agent for use, kit). On the contrary, the following elucidations are intended to apply analogously to all the subjects of the invention, irrespective of in which context (method, computer system, computer program product, use, contrast agent for use, kit) they occur.

Where steps are stated in an order in the present description or in the claims, this does not necessarily mean that the invention is limited to the order stated. Instead, it is conceivable that the steps are also executed in a different order or else in parallel to one another, unless one step builds on another step, which absolutely requires that the step building on the previous step be executed subsequently (which will however become clear in the individual case). The orders stated are thus preferred embodiments of the invention.

The present invention generates at least one artificial, contrast-enhanced tomogram for an examination object on the basis of a plurality of actual tomograms.

The "examination object" is usually a living being, preferably a mammal, very particularly preferably a human.

The term "plurality" means a number of at least two.

A "tomogram" is a representation of a layer in a field of view of the examination object. Terms synonymous with the term "tomogram" are the terms "sectional image", "slice image" and "tomographic image".

A tomogram reproduces the inner structures as would be present after slicing of the examination object or after cutting out a (thin) slice.

A tomogram is usually the result of a radiological examination. Examples of such radiological examinations are computed tomography (CT), magnetic resonance imaging (MRI) and sonography.

The term "actual" means that a tomogram is the result of an actual measurement, i.e., a measurement actually carried out on an examination object (preferably on a living being). The term "actual" serves for delimitation with respect to artificial tomograms, i.e., with respect to tomograms which are generated synthetically, which are thus not the (direct) result of an actual measurement, i.e., which are not the (direct) result of a measurement actually carried out on an examination object. However, an artificial (synthetically generated) tomogram can be based on an actual tomogram or on multiple actual tomograms. Artificial tomograms generated according to the invention are based on at least two, preferably at least three actual tomograms.

To generate actual tomograms, part of the examination object—the examination region—is usually subjected to a radiological examination. The "examination region", also called image volume or field of view (FOV), is in particular a volume which is imaged in radiological images. The examination region is typically defined by a radiologist, for example on an overview image (localizer). It is of course also possible for the examination region to alternatively or additionally be defined automatically, for example on the basis of a selected protocol. The examination region can be or comprise, for example, the liver or part of the liver, the lung or part of the lung, the heart or part of the heart, the aorta or part of the aorta, abdominal blood vessels, leg/pelvis blood vessels, the oesophagus or part of the oesophagus, the stomach or part of the stomach, the small intestine or part of the small intestine, the large intestine or part of the large intestine, the abdomen or part of the abdomen, the pancreas or part of the pancreas and/or some other part of the examination object.

The actual tomograms which are used according to the invention for generation of an artificial tomogram or multiple artificial tomograms represent layers within a field of view of an examination object after the administration of a contrast agent. The layers are preferably planar layers having a defined layer thickness, which layers are arranged parallel to one another in a spatial sequence within the field of view of the examination object.

In a first step, a contrast agent is administered (e.g., by an intravenous bolus injection) to the examination object, which contrast agent spreads in the field of view, and what are generated are a plurality of actual tomograms. It is conceivable that one or more tomograms are generated before the administration of the contrast agent; these so-called native images show the field of view in the absence of administration of a contrast agent.

The tomograms which are generated after administration of the contrast agent are usually generated successively: the field of view is scanned layer by layer and a tomogram is generated from each layer.

This is shown schematically in FIG. 1. FIG. 1 shows schematically a human, whose body is being subjected to a radiological examination. The upper body is the field of view. What are generated from the field of view are seven tomograms, which are identified by the reference signs T1, T2, T3, T4, T5, T6, and T7 in FIG. 1. Each tomogram represents a layer within the field of view. These layers are identified by the reference signs S1, S2, S3, S4, S5, S6, and S7 in FIG. 1. Each of these layers has a defined layer thickness. The layers can be directly adjacent to one another; they can be spaced apart; they can, however, also partially overlap. In any case, there are two layers which delimit the field of view; these are layers S1 and S7. These layers are also referred to as outer layers in this description. The remaining, inner layers S2, S3, S4, S5, and S6 each have two immediately neighbouring layers (also referred to as closest neighbours). S2 has layers S1 and S3 as its immediately neighbouring layers, S3 has layers S2 and S4 as its immediately neighbouring layers, and so on. Here, the term "immediately neighbouring" does not mean that the layers are directly adjacent to one another; as already explained, immediately neighbouring layers can also overlap or be spaced apart. Instead, the term "immediately neighbouring" is intended to indicate that there is no layer which is locally closer to a contemplated layer than the immediately neighbouring layers. Only layers from which a tomogram is generated are contemplated here.

In general, there are n layers, wherein n is a natural number greater than or equal to 2. There are 2 outer layers and n−2 inner layers. Layers S1, . . . , Sn are arranged parallel to one another in a spatial sequence, wherein the spatial sequence is reflected by the indices 1, . . . , n.

In conventional radiological examinations, the layers are usually scanned successively, i.e., in the order S1, S2, S3, S4, S5, S6, S7 or in the order S7, S6, S5, S4, S3, S2, S1. In this description, the term "scan" is used synonymously with the term "generate a tomogram".

Figure 2:
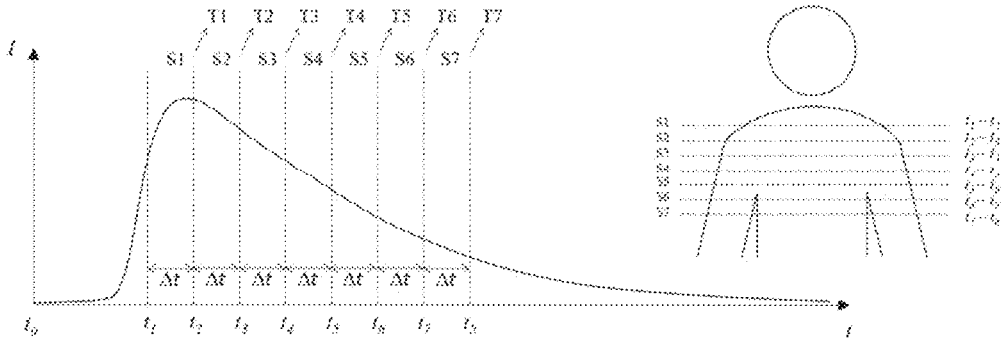
FIG. 2 shows a timeline of the generation of tomograms in a conventional radiological examination, according to some embodiments.

FIG. 2 shows schematically the generation of tomograms in a conventional radiological examination along a timeline. The abscissa (x-axis) specifies the time t. Time point t0 indicates the administration of a contrast agent; at time point t0 a contrast agent is administered to the examination object. Plotted on the ordinate (y-axis) is the intensity I of a signal attributable to the contrast agent in the field of view. The curve reflects the contrast enhancement caused by the contrast agent in the field of view. At time point t0 there is not yet any contrast agent in the field of view; it takes a certain length of time until the contrast agent has arrived in the field of view after administration (e.g., in the form of a bolus into an arm vein). At time point t1 there is already a significant contrast enhancement, caused by the contrast agent in the field of view. At time point t1 a first tomogram T1 is therefore generated. The acquisition of a tomogram itself takes a certain length of time. In the present example, the time for generation of a tomogram is Δt. In the present example, what is started immediately after the generation of a tomogram is the generation of a closest tomogram. Tomogram T1 is thus generated from layer S1 in the time between t1 and t2. Tomogram T2 is generated from layer S2 in the time between t2 and t3; tomogram T3 is generated from layer S3 in the time between t3 and t4 and so on.

As can be seen in FIG. 2 by way of example, the contrast enhancement I reaches its maximum just before time point t2 is reached and it then drops continuously. The drop is caused as a result of the contrast agent gradually being discharged from the field of view. This means that the tomograms which are generated within a later time span have a lower contrast enhancement than those tomograms which are generated within an earlier time span.

If the tomograms are generated in the order of the sequence of layers (S1, S2, S3, S4, S5, S6, S7), i.e., in the order T1, T2, T3, T4, T5, T6, T7, the contrast enhancement caused by contrast agent is lower in the "lower" layers (S7 and upwards) than the contrast enhancement in the "upper" layers (S1 and downwards). Tomograms of layers which, owing to a growing discharge of contrast agent from the field of view, have a lower contrast enhancement than tomograms of layers which are less affected by the discharge are also referred to as low-contrast tomograms in this description. Conversely, those tomograms of layers which are less affected by the discharge are referred to as high-contrast tomograms. In the case of the radiological examination depicted in FIG. 2 by way of example, the high-contrast tomograms are concentrated on the upper region of the upper body of the examination object, whereas the low-contrast tomograms are concentrated on the lower region of the upper body of the examination object. This means that the image quality in the lower region of the upper body of the examination object is poorer compared to that in the upper region of the upper body of the examination object because the tomograms acquired have a lower contrast.

In the case of generation of radiological images having a comparatively long scanning time using a contrast agent, the sequential generation of tomograms means that tomograms acquired later in the order have a lower contrast and thus a poorer image definition.

According to the invention, this problem is solved by contrast information being transferred from a high-contrast tomogram to a low-contrast tomogram.

Moreover, tomograms are preferably not generated in the order of the sequence of layers, but in an order in which the layers of the high-contrast tomograms are present with as even a distribution as possible in the field of view and the layers of the low-contrast tomograms are between the layers of the high-contrast tomograms.

Figure 3:
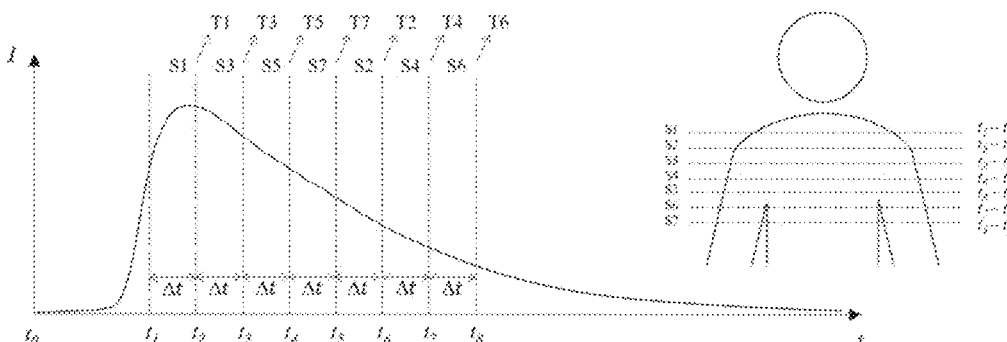
FIG. 3 shows a plot of the intensity of a measurement signal of a radiological examination as a function of time, according to some embodiments.

In some embodiments, in the case of a number n of layers S1, S2, . . . , Sn, tomograms T1, T3, T5, etc. are generated first, followed by tomograms T2, T4, T6, . . . , wherein a tomogram T1 respectively represents layer Si, wherein i is an index which assumes values from 1 to n and n is an odd number greater than 2. In other words: what are generated are tomograms of the layers having odd indices in ascending or descending order and then tomograms of the layers having even indices in ascending or descending order. This is depicted in schematic form and by way of example in FIG. 3. As in FIG. 2, what is depicted in FIG. 3 in a graphical plot is the intensity I of a measurement signal of the radiological examination, which signal is attributable to the presence of contrast agent in the field of view, as a function of time. What are generated from the immediately neighbouring layers in the field of view S1, S2, . . . , S7 are the tomograms T1, T2, . . . , T7. However, the tomograms are not generated in the order in which the respective layers lie next to one another in the field of view, but in the order T1, T3, T5, T7, T2, T4, T6.

An alternative order is the order T7, T5, T3, T1, T6, T4, T2.

A further alternative order is the order T1, T3, T5, T7, T6, T4, T2.

A further alternative order is the order T7, T5, T3, T1, T2, T4, T6.

The number of tomograms which are generated may be an odd number.

In a further embodiment, the layers in the case of an odd number n of layers having the indices 1, 2, . . . , n are scanned in an order according to the following rules:

(i) Tomograms of the layers having odd-numbered indices are generated first, followed by tomograms of the layers having even-numbered indices. A layer from which a tomogram has been generated is referred to as a scanned layer. A scanned layer contains an identification number; the identification number specifies at which point in the order the layer is scanned.

(ii) Tomograms of the two outermost layers are generated first in the order S1, Sn or Sn, S1.

(iii) The gap having the greatest distance between two scanned layers is then identified. A gap is a region between two scanned layers in which yet unscanned layers are situated. If there are multiple gaps having the same distance, what is calculated for each of these gaps is the sum of the identification numbers of the scanned layers delimiting the gap. That gap in which the sum of the identification numbers is the greatest is chosen. If there are two or more of such gaps having the same greatest identification numbers, what is chosen is that gap which has the greatest distance from the last-scanned layer. If there are multiple gaps having a greatest distance from the last-scanned layer, what is selected from the relevant gaps is that gap which has the greatest distance from the layer which was scanned immediately before the last-scanned layer (and so on).

(iv) That layer in a gap that best leads to halving of the gap is scanned. If there are two or more of these layers, what is chosen is that layer which has the greatest distance from the last-scanned layer.

Rule (i) takes precedence over all the other rules. Rule (ii) takes precedence over rules (iii) and (iv). Rule (iii) takes precedence over rule (iv).

Figure 4:
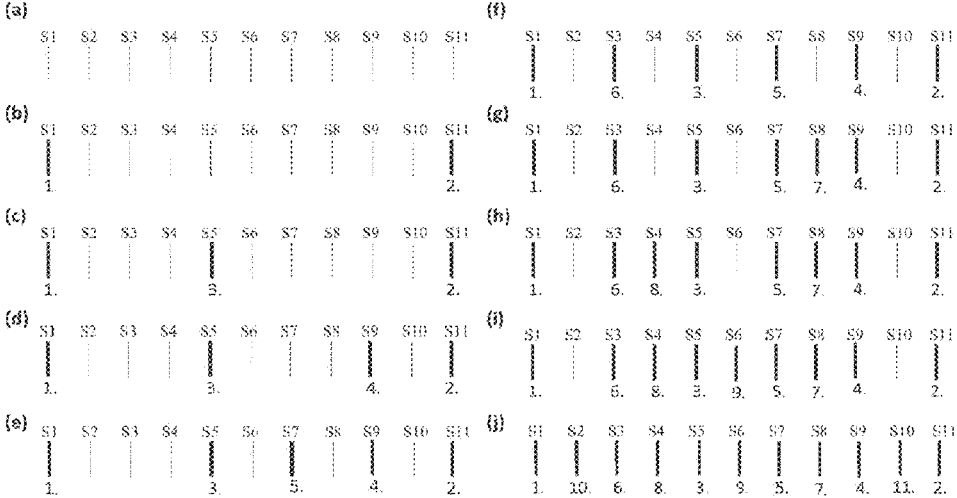
FIG. 4 shows a procedure for scanning layers in a field of view, according to some embodiments.

FIG. 4 illustrates the procedure by way of example and in schematic form. FIG. 4 (a) depicts schematically eleven layers S1, . . . , S11 that follow one another in a field of view. The layers bear the indices from 1 to 11. The indices specify the order in which the layers follow one another locally in the field of view. None of the layers has been scanned as yet. Unscanned layers are characterized by dashed lines.

According to rule (i), the odd-numbered layers are scanned before the even-numbered layers are scanned. In other words: as long as there is still at least one unscanned odd-numbered layer, no even-numbered layer is scanned.

According to rule (ii), the outer layers are scanned first; either S1 first and then S11 or vice versa.

In FIG. 4 (b), what is depicted schematically is that S1 is scanned first in this example. S1 bears the identification number 1. Scanned layers are identified by a continuous solid line. S11 is scanned after S1. S11 receives the identification number 2.

According to rule (iii), what is now chosen is that gap which has the greatest distance between two scanned layers. As can be seen in FIG. 4 (b), there are only two scanned layers (S1, S11) which enclose a single gap. In said gap, the next layer is scanned.

According to rule (iv), what is identified in a gap is that layer which best leads to halving of the gap. S6 lies exactly in the middle of the gap; scanning of S6 would lead to halving of the gap. However, layer S6 bears an even-numbered index (6), and as long as there are still odd-numbered layers, preference is given thereto (rule (i)). After S6, scanning of layer S5 or layer S7 would best lead to halving of the gap. There are thus two possible layers (S5, S7) in the gap that could be scanned. According to rule (iv), what is selected from the two possible layers is that layer which has the furthest distance from the last-scanned layer. The last-scanned layer is S11. The distance of S5 from S11 is greater than the distance of S7 from S11. Accordingly, layer S5 is scanned as the next layer to be scanned. It receives the identification number 3 in FIG. 4 (c).

In FIG. 4 (c), it can be seen that the scanning of layer S5 yields two gaps. A gap between layers S1 and S5 and a further gap between layers S5 and S11. The gap between S5 and S11 is the larger gap; it is selected next according to rule (iii). In the selected gap, what is identified is that layer which best leads to halving of the gap. S8 lies exactly in the middle between S5 and S11; however, S8 is a layer having an even-numbered index (8), which does not yet have its turn according to rule (i), since yet unscanned odd-numbered layers are present. After S8, what would best lead to halving of the gap would be S7 and S9. S9 has the greatest distance from the last-scanned layer (S5) and is therefore scanned next. In FIG. 4 (d), S9 is marked with a solid line and bears the identification number 4.

In FIG. 4 (d), it can be seen that the scanning of layer S9 yields three gaps. A gap between S1 and S5, a gap between S5 and S9 and a gap between S9 and S11. The gap between S9 and S11 is smaller than the other two gaps and is therefore not a possibility to begin with (rule iii). The gap between S1 and S5 has the same distance as the gap between S5 and S9. According to rule (iii), what is now calculated for each of these gaps is the sum of the identification numbers of the delimiting layers. The gap between S1 and S5 is delimited by layers S1 and S5. Their identification numbers are 1 (S1) and 3 (S5). The sum is four. The gap between S5 and S9 is delimited by layers S5 and S9. Their identification numbers are 3 (S5) and 4 (S9). The sum is seven. The sum of the identification numbers of the layers which delimit the gap between S5 and S9 is thus greater than the sum of the identification numbers of the layers which delimit the gap between S1 and S5. The gap between S5 and S9 is selected. Within the gap, what is selected is that layer which best leads to halving of the gap (rule iv). This is layer S7. It is scanned next; it receives the identification number 5 in FIG. 4 (*e*).

In FIG. 4 (*e*), it can be seen that there is a largest gap, specifically the gap between S1 and S5. It is selected next (rule (iii)). Within the gap, layer S3 is that layer which best leads to halving of the gap (rule iv). This layer is scanned next; it receives the identification number 6 in FIG. 4 (*f*).

In FIG. 4 (*f*), it can be seen that, in the present example, all layers having an odd-numbered index have already been scanned. Thus, what now follow are the layers having the even-numbered indices. According to rule (iii), the gap having the greatest distance between the layers delimiting the gap is identified. However, the gaps all have the same distance. Thus, according to rule (iii), which is chosen is the gap for which the sum of the identification numbers of the layers delimiting the gap is the greatest. The sum of the identification numbers of the delimiting layers is: 7 in the case of S1/S3, 9 in the case of S3/S5, 8 in the case of S5/S7, 9 in the case of S7/S9 and 6 in the case of S9/S11. There are thus two possible gaps. According to rule (iii), what is chosen therefrom is that gap which has the greatest distance from the last-scanned layer; this is gap S7/S9, since the last-scanned layer (S3) is closer to layer S3/S5 than to layer S7/S9. Within the gap between S7 and S9, there is only one unscanned layer (S8); this is selected; it receives the identification number 7 in FIG. 4 (*g*).

In FIG. 4 (*g*), the remaining gaps are the gaps between S1 and S3, S3 and S5, S5 and S7 and also S9 and S11, of which it is already known from the previous step that the gap between S3 and S5 has, now, the greatest sum of the identification numbers (9). Within the gap between S3 and S5, there is only one unscanned layer (S4); this is selected; it receives the identification number 8 in FIG. 4 (*h*).

In FIG. 4 (*h*), the remaining gaps are the gaps between S1 and S3, S5 and S7 and also S9 and S11, of which it is already known from a previous step that the gap between S5 and S7 has, now, the greatest sum of the identification numbers (8). Within the gap between S5 and S7, there is only one unscanned layer (S6); this is selected; it receives the identification number 9 in FIG. 4 (*i*).

In FIG. 4 (*i*), the remaining gaps are the gaps between S1 and S3 and also S9 and S11, of which it is already known from a previous step that the gap between S1 and S3 has, now, the greatest sum of the identification numbers (7). Within the gap between S1 and S3, there is only one unscanned layer (S2); this is selected; it receives the identification number 10 in FIG. 4 (*j*); the layer which is then still remaining as the last one (S10) receives the identification number 11 in FIG. 4 (*j*).

The scanning order is thus S1, S11, S5, S9, S7, S3, S8, S4, S6, S2, S10 in the present example.

If layer S11 is the first-scanned layer instead of layer S1 (see rule ii), the aforementioned rules yield the following order: S11, S1, S7, S3, S5, S9, S4, S8, S6, S10, S2.

Other rules and orders are conceivable. Preferably, an order or rules for an order is/are defined at the start of the training of the prediction model and said order/rules is/are maintained during training, during validation and during prediction with the aid of the trained prediction model.

According to the invention, the order in which the layers in a field of view are scanned is defined such that there is at least one tomogram of a layer which is immediately neighbouring in relation to two previously scanned layers. In other words: there is at least one tomogram of a layer that has been generated later than the tomograms of the immediately neighbouring layers.

There may be a plurality of tomograms Tj, wherein each tomogram of the plurality of tomograms represents one layer Sj, wherein each tomogram Tj has been generated later than tomograms Tj−1 and Tj+1 of layers Sj−1 and Sj+1 which are immediately neighbouring in relation to layer Sj, wherein j is an index which specifies the position of the layer in an arrangement of layers in a field of view.

Each tomogram Tj of a layer Sj is lower-contrast than tomograms Tj−1 and Tj+1 of the immediately neighbouring layers Sj−1 and Sj+1. According to the invention, what is generated for each low-contrast tomogram Tj is an artificial, contrast-enhanced tomogram Tj*.

In one embodiment according to the invention, the artificial, contrast-enhanced tomogram Tj* is generated on the basis of the low-contrast tomogram Tj of layer Sj and on the basis of tomograms Tj−1 and Tj+1 of the immediately neighbouring layers Sj−1 and Sj+1.

However, it is also conceivable to use not only the tomograms of the immediately neighbouring layers, but also tomograms of more distant layers for generation of an artificial tomogram.

In a further embodiment according to the invention, the artificial, contrast-enhanced tomogram Tj* is generated on the basis of the low-contrast tomogram Tj of layer Sj and on the basis of a plurality of tomograms Tj−k and Tj+k of the neighbouring layers Sj−k and Sj+k, wherein k is an index which passes through values from 1 to m, wherein m is a whole natural number. Preferably, m is 2 or 3.

The prediction model according to the invention is configured (trained) to transfer contrast information from a (high-contrast) tomogram to a (low-contrast) tomogram. Usually, the high-contrast tomogram has been generated before the low-contrast tomogram; the low-contrast tomogram is usually affected by washout to a greater extent than the high-contrast tomogram. In a preferred embodiment, the high-contrast and the low-contrast tomograms represent immediately neighbouring layers in a field of view, i.e. the high-contrast tomogram represents a first layer after administration of a contrast agent and the low-contrast tomogram represents a second layer after the administration of the contrast agent and the first and the second layer are immediately neighbouring and the high-contrast tomogram has been generated before the low-contrast tomogram.

In the case of more than two layers/two tomograms, the prediction model is preferably configured (trained) to transfer the contrast enhancement of tomograms Tj−k and Tj+k of neighbouring layers Sj−k and Sj+k to tomogram Tj of layer Sj, wherein k is an index which passes through values from 1 to m, wherein m is a whole natural number. Preferably, m is 1, 2 or 3.

The prediction model is configured (trained) to generate an artificial, contrast-enhanced tomogram of a layer in a field of view on the basis of at least two, preferably at least three measured tomograms. The at least two measured tomograms may comprise:

a first tomogram, wherein the first tomogram represents a first layer within a field of view of an examination object after the administration of a contrast agent, and a second tomogram, wherein the second tomogram represents a second layer within the field of view of the examination object after the administration of the contrast agent, wherein the second tomogram is/has been generated after the first tomogram.

Preferably, the first layer and the second layer are immediately neighbouring in relation to one another.

The at least three measured tomograms may comprise:

a first tomogram, wherein the first tomogram represents a first layer within a field of view of an examination object after the administration of a contrast agent, a second tomogram, wherein the second tomogram represents a second layer within the field of view of the examination object after the administration of the contrast agent, and a third tomogram, wherein the third tomogram represents a third layer within the field of view of the examination object after the administration of the contrast agent, wherein the third layer preferably lies between the first and the second layer. Preferably, the first layer and the second layer are immediately neighbouring in relation to the third layer. The third tomogram is/was generated after the first and the second tomogram.

According to the invention, an artificial, contrast-enhanced tomogram which represents a layer with a higher contrast enhancement than the corresponding actual measured tomogram is generated on the basis of the at least two measured tomograms.

An artificial, contrast-enhanced tomogram which represents the third layer with a higher contrast enhancement than the third (actual, measured) tomogram may be generated on the basis of at least three measured tomograms.

In order for the prediction model according to the invention to be able to make the predictions described here, it must be appropriately configured beforehand.

The prediction model is preferably trained (configured) with the aid of a self-learning algorithm in a supervised or unsupervised machine learning process. Training data are used for learning. Said training data comprise, of a multiplicity of examination objects, a plurality of tomograms of an examination region for each examination object. The examination region (field of view) is usually identical for all examination objects (e.g., part of a human body or an organ or part of an organ). The tomograms of the training data set are also referred to as reference representations in this description.

For each examination object, the training data comprise at least i) a first reference tomogram, wherein the first reference tomogram represents a first layer within the field of view after an administration of a contrast agent, and ii) a second reference tomogram, wherein the second reference tomogram represents a second layer within the field of view after the administration of the contrast agent, wherein the second reference tomogram represents the second layer at a later time than the first reference tomogram the first layer and is hence lower-contrast than the first reference tomogram.

Preferably, the training data comprise for each examination object at least i) a first reference tomogram, wherein the first reference tomogram represents a first layer within the field of view after an administration of a contrast agent, ii) a second reference tomogram, wherein the second reference tomogram represents a second layer within the field of view after the administration of the contrast agent, and iii) a third reference tomogram, wherein the third reference tomogram represents a third layer within the field of view after the administration of the contrast agent.

The third layer in the field of view lies between the first layer and the second layer, and the third reference tomogram was generated after the first reference tomogram and the second reference tomogram.

When using two reference tomograms for each examination object, the prediction model is trained to generate for each examination object an artificial, contrast-enhanced tomogram of the second layer. To this end, the first and the second reference tomogram are input into the prediction model, and the prediction model is trained to output an artificial tomogram which represents the second layer, but which has an increased contrast enhancement compared to the second measured reference tomogram. The prediction model is trained to transfer contrast information from the first reference tomogram to the second reference tomogram.

When using three reference tomograms for each examination object, the prediction model is trained to generate for each examination object an artificial, contrast-enhanced tomogram of the third layer. To this end, the first, the second and the one third reference tomogram are input into the prediction model, and the prediction model is trained to output an artificial tomogram which represents the third layer, but which has an increased contrast enhancement compared to the measured third reference tomogram. The prediction model is trained to transfer contrast information from the first and the second reference tomogram to the third reference tomogram.

When using more than three reference tomograms per examination object, the prediction model is trained to generate for each examination object an artificial, contrast-enhanced tomogram of a defined layer. The reference tomograms comprise a reference tomogram of the defined layer that usually has a lower contrast enhancement than the other reference tomograms of further layers. The measured reference tomograms are input into the prediction model, and the prediction model is trained to output an artificial tomogram which represents the defined layer, but which has an increased contrast enhancement compared to the measured reference tomogram of the defined layer. The prediction model is trained to transfer contrast information from the other reference tomograms to the measured reference tomogram of the defined layer.

The self-learning algorithm generates, during machine learning, a statistical model which is based on the training data. This means that the examples are not simply learnt by heart, but that the algorithm "recognizes" patterns and regularities in the training data. The prediction model can thus also assess unknown data. Validation data can be used to test the quality of the assessment of unknown data.

Self-learning systems trained by means of supervised or unsupervised learning are widely described in the prior art (see, for example, G. Bonaccorso: Hands-On Unsupervised Learning with Python, Packt Publishing, 2019, ISBN: 978-1789348279).

The prediction model may be an artificial neural network or may comprise at least such a network.

An artificial neural network comprises at least three layers of processing elements: a first layer with input neurons (nodes), an N-th layer with at least one output neuron (nodes) and N-2 inner layers, where N is a natural number and greater than 2.

The input neurons serve to receive measured tomograms. The output neurons serve to output artificial tomograms.

The processing elements of the layers between the input neurons and the output neurons are connected to one another in a predetermined pattern with predetermined connection weights.

The training of the neural network can, for example, be carried out by means of a backpropagation method. The aim here in respect of the network is maximum reliability of mapping of given input data onto given output data. The mapping quality is described by an error function. The goal is to minimize the error function. In the case of the back-propagation method, an artificial neural network is taught by the alteration of the connection weights.

In the trained state, the connection weights between the processing elements contain information regarding the relationship between measured and artificially generated tomograms that can be used in order to be able to generate artificial tomograms on the basis of new tomograms not used during the training.

A cross-validation method can be used in order to divide the data into training and validation data sets. The training data set is used in the backpropagation training of network weights. The validation data set is used in order to check the accuracy of prediction with which the trained network can be applied to unknown data.

In a particularly preferred embodiment, the model used for training comprises a generative adversarial network (GAN). Such a GAN usually comprises two artificial neural networks, a first network and a second network. The first network is often also referred to as the generator. The second network is often also referred to as the discriminator. The generator and the discriminator are trained together and are engaged in a competition at the same time: the generator generates an artificial tomogram, and the discriminator aims to distinguish the artificial tomogram from an actual tomogram. The generator is trained to generate artificial tomograms which the discriminator cannot distinguish from actual tomograms, and the discriminator is trained for increasingly better distinguishing of the artificial tomograms, which are becoming increasingly better, from actual tomograms.

Figure 5:
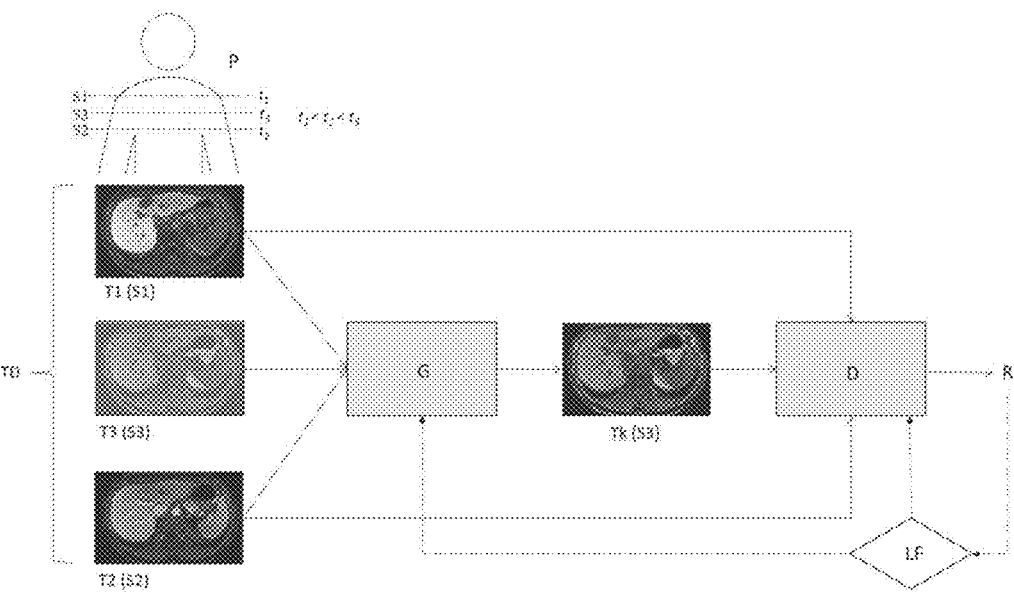
FIG. 5 shows a schematic depicting the training of a prediction model, according to some embodiments.

The principle is depicted schematically in FIG. 5. For training, the prediction model comprises a first artificial neural network, the generator G, and a second artificial neural network, the discriminator D. The training data TD for training of the two networks comprise a first tomogram T1, a second tomogram T2 and a third tomogram T3 for a multiplicity of persons P (only one individual person is depicted schematically in FIG. 5 for the sake of clarity). The first tomogram T1 represents a first layer S1, the second tomogram T2 represents a second layer S2 and the third tomogram T3 represents a third layer S3 after the administration of a contrast agent. Layer S3 lies between layers S1 and S2. The tomograms were generated by scanning of the layers in a radiological examination method after the administration of a contrast agent. Layers S1 and S2 were scanned before layer S3. In other words: tomogram T3 was generated after tomograms T1 and T2. Since tomogram T3 has been generated later than tomograms T1 and T2, it has, following the washout of contrast agent that has progressed, a lower contrast enhancement than tomograms T1 and T2. In other words: T3 is—in comparison with T1 and T2—low-contrast; T1 and T2 are—in comparison with T3—high-contrast.

The first tomogram T1, the second tomogram T2 and the third tomogram T3 are fed to the generator G. The generator is configured to generate on the basis of these input data an artificial tomogram Tk which represents the third layer. The generator G is trained to generate an artificial tomogram Tk which has a higher contrast enhancement than the third tomogram T3. The generator G is trained to transfer contrast information from the first tomogram T1 and the second tomogram T2 to tomogram T3 and to thereby generate the artificial, contrast-enhanced tomogram Tk. The discriminator receives actual high-contrast tomograms T1 and T2 and also artificially generated, contrast-enhanced tomograms Tk and is configured to specify for a received tomogram whether the tomogram is an artificial tomogram or an actual tomogram. The discriminator thus carries out a classification; it assigns each received tomogram to one of two classes, a first class with actual tomograms and a second class with artificially generated tomograms.

The result of the classification is a classification result R. Since it is known for each of the tomograms fed to the discriminator whether the tomogram is an actual tomogram or an artificially generated tomogram, the result of the classification can be assessed. The assessment is done with the aid of a loss function LF. The result of the assessment is then incorporated both into the training of the generator G and into the training of the discriminator D, which are both trained to deliver an improved result: in the case of the generator G, this is generation of an artificial tomogram which cannot be distinguished from an actual tomogram by the discriminator, and in the case of the discriminator, this is distinguishing of artificial tomograms from actual tomograms.

If the system comprising generator and discriminator has been trained and if the two networks reach a predefined (desired) accuracy, the prediction model according to the invention can be obtained from the system. To this end, the system can be reduced to the generator; for prediction, the discriminator is no longer required. The generator has learnt to generate on the basis of at least two, preferably at least three tomograms, an artificial tomogram which cannot be distinguished from an actual tomogram or can only be distinguished with difficulty.

Figure 6:
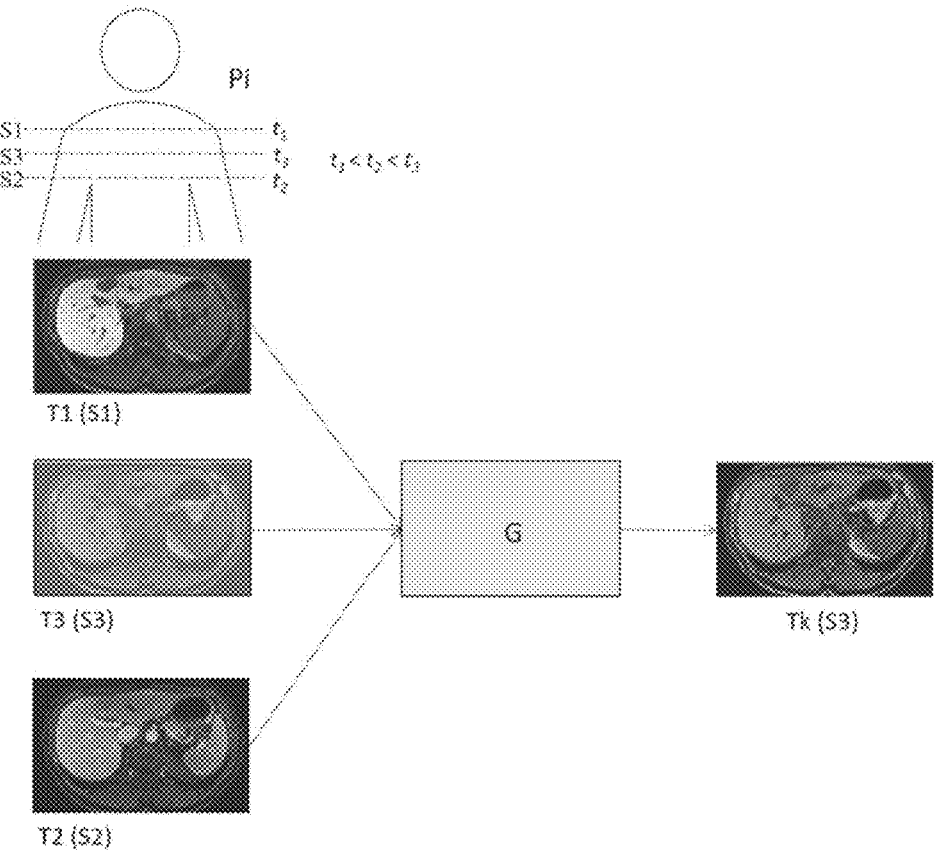
FIG. 6 shows a prediction model, according to some embodiments.

FIG. 6 shows, by way of example and in schematic form, the prediction model according to the invention. This is the generator G which is shown in FIG. 5 and which has been trained on the basis of a multiplicity of reference tomograms in an unsupervised learning process as described with regard to FIG. 5.

In the present example, at least three tomograms are fed to the generator G for prediction: a first tomogram T1, a second tomogram T2 and a third tomogram T3. The first tomogram T1 represents a first layer S1 in a field of view of a person Pi, the second tomogram T2 represents a second layer S2 in the field of view of the person Pi and the third tomogram T3 represents a third layer S3 in the field of view of the person Pi. Layer S3 lies between layers S1 and S2. The first tomogram T1 was generated at a time point t1 after administration of a contrast agent. The second tomogram T2 was generated at a time point t2 after administration of the contrast agent. The third tomogram T3 was generated at a time point t3 after administration of the contrast agent. Time point t3 comes after time points t2 and t1.

The generator G generates from the received tomograms an artificial tomogram Tk which represents the third layer S3. The artificial tomogram has a higher contrast enhancement than the third tomogram T3.

In a preferred embodiment, a system composed of artificial neural networks and based on a CycleGAN or on a Pix2Pix architecture is used for training of the prediction model.

Further information on generative adversarial networks can be found in publications relating to this topic (see, for example: N. K. Manaswi: Generative Adversarial Networks with Industrial Use Cases, BPB PUBN Verlag, 2020, ISBN: 9789389423853; WO2020/246996, WO2020/242572, EP3785231, WO2021/049784, EP3767590, US20190295302)

The method according to the invention can be executed with the aid of a computer system.

Figure 7:
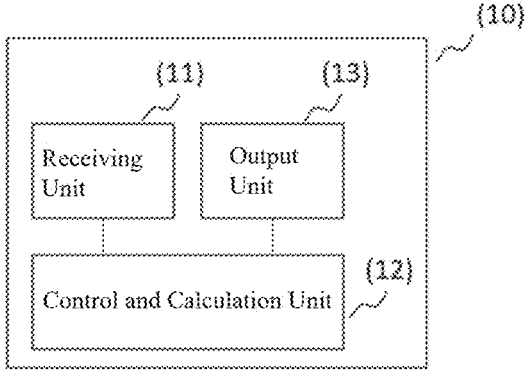
FIG. 7 shows a computer system, according to some embodiments.

FIG. 7 shows, in schematic form and by way of example, one embodiment of the computer system according to the invention. The computer system (10) comprises a receiving unit (11), a control and calculation unit (12) and an output unit (13).

A "computer system" is a system for electronic data processing that processes data by means of programmable computation rules. Such a system usually comprises a control and calculation unit, often also referred to as "computer", said unit comprising a processor for carrying out logical operations and a memory for loading a computer program, and also a peripheral.

In computer technology, "peripherals" refers to all devices that are connected to the computer and are used for control of the computer and/or as input and output devices. Examples thereof are monitor (screen), printer, scanner, mouse, keyboard, joystick, drives, camera, microphone, speakers, etc. Internal ports and expansion cards are also regarded as peripherals in computer technology.

Today's computer systems are commonly subdivided into desktop PCs, portable PCs, laptops, notebooks, netbooks and tablet PCs, and so-called handhelds (e.g., smartphones); all such systems can be used for execution of the invention.

Inputs into the computer system (e.g., for control by a user) are achieved via input means such as, for example, a keyboard, a mouse, a microphone, a touch-sensitive display and/or the like. Outputs are achieved via the output unit (13), which can be especially a monitor (screen), a printer and/or a data storage medium.

The computer system (10) according to the invention is configured to generate an artificial, contrast-enhanced tomogram from at least two, preferably at least three actual tomograms of an examination region of an examination object that represent the examination region after administration of a contrast agent.

The control and calculation unit (12) serves for control of the receiving unit (11) and the output unit (13), coordination of the data and signal flows between the various units, processing of representations of the examination region and/as well as generation of artificial tomograms. It is conceivable that multiple control and calculation units are present.

The receiving unit (11) serves for receiving actual tomograms. The tomograms can, for example, be transmitted from a magnetic resonance imaging system or be transmitted from a computed tomography system or be read from a data storage medium. The magnetic resonance imaging system or the computed tomography system can be a component of the computer system according to the invention. However, it is also conceivable that the computer system according to the invention is a component of a magnetic resonance imaging system or a computed tomography system. Tomograms can be transmitted via a network connection or a direct connection. Tomograms can be transmitted via radio communication (WLAN, Bluetooth, mobile communications and/or the like) and/or via a cable. It is conceivable that multiple receiving units are present. The data storage medium, too, can be a component of the computer system according to the invention or be connected thereto, for example via a network. It is conceivable that multiple data storage media are present.

The tomograms and possibly further data (such as, for example, information about the examination object, image-acquisition parameters and/or the like) are received by the receiving unit and transmitted to the control and calculation unit.

The control and calculation unit is configured to generate artificial tomograms on the basis of the received data.

Via the output unit (13), the artificial tomograms can be displayed (e.g., on a monitor), be output (e.g., via a printer) or be stored in a data storage medium. It is conceivable that multiple output units are present.

Figure 8:
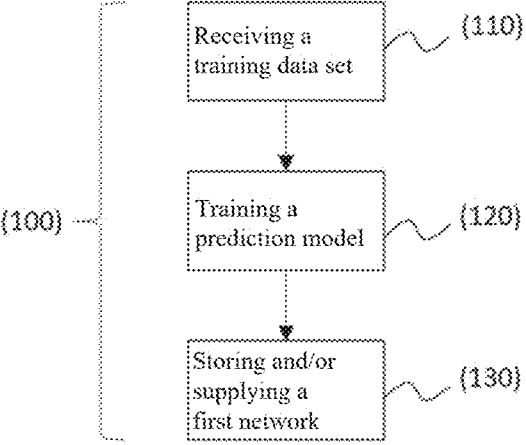
FIG. 8 shows a method for training a prediction model, according to some embodiments.

FIG. 8 shows, by way of example and in schematic form, a preferred embodiment of the method according to the invention for training a prediction model in the form of a flow chart.

The method (100) may comprise the steps of:

(110) receiving a training data set, wherein the training data set comprises a plurality of actual reference tomograms for each reference object of a multiplicity of reference objects, wherein the reference tomograms represent a field of view of the reference object after the administration of a contrast agent, wherein the reference tomograms comprise at least three tomograms for each reference object: a first reference tomogram, a second reference tomogram and a third reference tomogram, wherein the first tomogram represents a first layer within the field of view, wherein the second tomogram represents a second layer within the field of view, wherein the third tomogram represents a third layer within the field of view, wherein the third layer in the field of view lies between the first layer and the second layer, wherein the third tomogram has been generated after the first tomogram and the second tomogram, (120) training the prediction model, wherein the prediction model comprises two artificial neural networks for training, a first network and a second network, wherein the first network is configured to receive the first, the second and the third tomogram for each reference object and to generate an artificial tomogram on the basis of the received tomograms, wherein the artificial tomogram represents the third layer in the field of view, wherein the second network is configured to receive the third tomogram and/or the artificial tomogram and to state for the received tomogram whether the received tomogram is an actual tomogram or an artificially generated tomogram, wherein the first network and the second network are trained together in an unsupervised learning process, wherein the first network is trained to generate artificial tomograms which are not rated as artificial by the second network and the second network is trained to distinguish artificial tomograms from actual tomograms, (130) storing at least the first network and/or supplying the first network to a method for predicting an artificial tomogram for an examination object.

Figure 9:
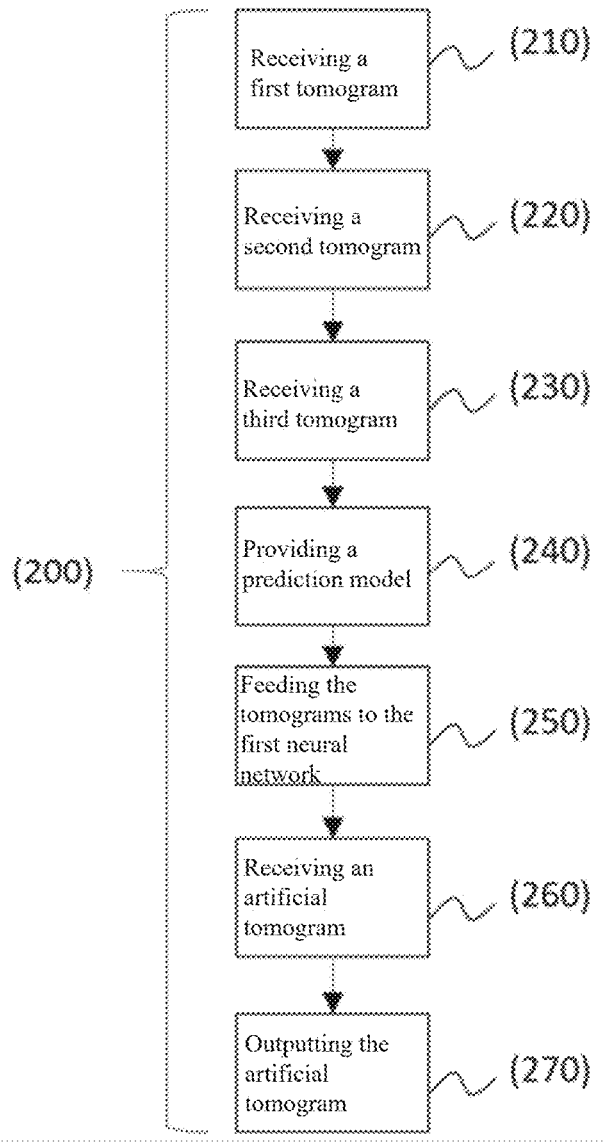
FIG. 9 shows a method for generating an artificial, contrast-enhanced tomogram, according to some embodiments.

FIG. 9 shows, by way of example and in schematic form, a preferred embodiment of the method according to the invention for generating an artificial, contrast-enhanced tomogram in the form of a flow chart.

The method (200) comprising the steps of:

(210) receiving a first tomogram, wherein the first tomogram represents a first layer within a field of view of an examination object after the administration of a contrast agent, (220) receiving a second tomogram, wherein the second tomogram represents a second layer within the field of view of the examination object after the administration of the contrast agent, (230) receiving a third tomogram, wherein the third tomogram represents a third layer within the field of view of the examination object after the administration of the contrast agent, wherein the third layer lies between the first and the second layer, wherein the third tomogram is generated after the first and the second tomogram, (240) providing a prediction model, wherein the prediction model has been trained in an unsupervised learning process on the basis of a training data set, wherein the training data set comprises, for a multiplicity of reference objects, a first reference tomogram, a second reference tomogram and a third reference tomogram in each case, wherein the reference tomograms represent layers in a field of view of the reference object, wherein the first reference tomogram represents a first layer within the field of view, wherein the second tomogram represents a second layer within the field of view, wherein the third tomogram represents a third layer within the field of view, wherein the third layer in the field of view lies between the first layer and the second layer, wherein the third tomogram has been generated after the first tomogram and the second tomogram, wherein the prediction model comprises two artificial neural networks for training, a first network and a second network, wherein the first network is configured to receive the first, the second and the third tomogram for each reference object and to generate an artificial tomogram on the basis of the received tomograms, wherein the artificial tomogram represents the third layer in the field of view, wherein the second network is configured to receive the third tomogram and/or the artificial tomogram and to state for the received tomogram whether the received tomogram is an actual tomogram or an artificially generated tomogram, wherein the first network and the second network have been trained together in an unsupervised learning process, wherein the first network has been trained to generate artificial tomograms which are not rated as artificial by the second network and the second network is trained to distinguish artificial tomograms from actual tomograms, (250) feeding the first, second and third tomogram to the first neural network, (260) receiving an artificial tomogram, wherein the artificial tomogram represents the third layer in the field of view, and (270) outputting the artificial tomogram.

Further embodiments include:

1. A method for generating an artificial, contrast-enhanced tomogram, comprising the steps of:

receiving a first tomogram, wherein the first tomogram represents a first layer within a field of view of an examination object after the administration of a contrast agent, receiving a second tomogram, wherein the second tomogram represents a second layer within the field of view of the examination object after the administration of the contrast agent, receiving a third tomogram, wherein the third tomogram represents a third layer within the field of view of the examination object after the administration of the contrast agent, wherein the third layer lies between the first and the second layer, wherein the third tomogram is generated after the first and the second tomogram, providing a prediction model, wherein the prediction model has been trained on the basis of a training data set to transfer contrast information from at least two tomograms to one tomogram and to generate an artificial tomogram in the process, feeding the first, second and third tomogram to the prediction model, receiving an artificial tomogram from the prediction model, wherein the artificial tomogram represents the third layer in the field of view, wherein contrast information from the first and the second tomogram has been transferred in the artificial tomogram, and outputting the artificial tomogram.

2. A method for generating an artificial, contrast-enhanced tomogram, comprising the steps of:

generating a number n of tomograms T1, . . . , Tn, wherein n is an odd number greater than 2, wherein each tomogram T1, . . . , Tn respectively represents a layer S1, . . . , Sn within a field of view of an examination object after the administration of a contrast agent, wherein the layers S1, . . . , Sn are planar and are arranged parallel to one another, wherein the generation of the tomograms T1, . . . , Tn comprises the following sub-steps:

generating the tomograms T1 and Tn of the layers S1 and Sn in the order T1, Tn or in the order Tn, T1, subsequently generating the tomograms T2 to Tn−1 in an order in which each generated tomogram represents a layer which, at the moment of generation of said tomogram, respectively lies in a region of layers of which no tomogram has yet been generated, wherein each of the regions is delimited by respectively two layers of which a tomogram has already been generated, providing a prediction model, wherein the prediction model has been trained on the basis of a training data set to transfer contrast information from at least two tomograms to one tomogram and to generate an artificial tomogram in the process, feeding at least a first, second and third tomogram to the prediction model, wherein the first and the second tomogram have been generated before the third tomogram (or: wherein the third tomogram has been generated after the first and the second tomogram), receiving an artificial tomogram from the prediction model, wherein the artificial tomogram represents the third layer in the field of view, wherein contrast information from the first and the second tomogram has been transferred in the artificial tomogram, and outputting the artificial tomogram.

3. A method for generating an artificial, contrast-enhanced tomogram, comprising the steps of:

receiving a number n of tomograms T1, . . . , Tn, wherein n is a whole odd number greater than 2, wherein each tomogram T1, . . . , Tn respectively represents a layer S1, . . . , Sn within a field of view of an examination object after the administration of a contrast agent, wherein the layers S1, . . . , Sn are arranged parallel to one another in a spatial sequence, wherein the spatial sequence is specified by the indices 1, . . . , n, wherein the tomograms have been generated in an order in which the tomograms T2k+1 are generated first of all and then the tomograms T2k, wherein k is an index which passes through the values from 0 to (n–1)/2, providing a prediction model, wherein the prediction model has been trained on the basis of a training data set to transfer contrast information from respectively two immediately neighbouring tomograms which have been generated at an earlier time to tomograms which have been generated at a later time and to generate an artificial, contrast-enhanced tomogram in the process, feeding the received tomograms to the prediction model, receiving a number (n–1)/2 of artificial tomograms KT, wherein each artificial tomogram $KT_{2i+1}$ represents the respective layer $S_{2i+1}$ and has been generated on the basis of the tomograms $T_{2i}$ and $T_{2i+2}$, wherein i is an index which can assume the numbers from 0 to k, and outputting at least one of the artificial tomograms.

4. A method for generating an artificial, contrast-enhanced tomogram, comprising the steps of:

receiving a number n of tomograms T1, . . . , Tn, wherein n is a whole odd number greater than 1, wherein each tomogram T1, . . . , Tn respectively represents a layer S1, . . . , Sn within a field of view of an examination object after the administration of a contrast agent, wherein the layers S1, . . . , Sn are arranged parallel to one another in a spatial sequence, wherein the spatial sequence is specified by the indices 1, . . . , n, wherein each tomogram T2 to Tn–1, at the moment of generation thereof, lies in a respective region of layers of which no tomogram has yet been generated, wherein each of the regions is delimited by two layers of which a tomogram has already been generated at said moment, providing a prediction model, wherein the prediction model has been trained on the basis of a training data set to transfer contrast information to tomograms of those layers for which tomograms have been generated of the neighbouring layers at an earlier time and to generate an artificial contrast-enhanced tomogram in the process, feeding a tomogram $T_j$ of a layer $S_j$ and a plurality of tomograms $T_{j-x}$ and $T_{j+k}$ of the neighbouring layers $S_{j-k}$ and $S_{j+k}$ to the prediction model, wherein k is an index which passes through the values from 1 to m, wherein m is a whole number greater than 1, wherein the layer $S_j$ lies between the layers $S_{j-k}$ and $S_{j+k}$, wherein only those tomograms which have been generated before the tomogram $T_j$ are fed to the prediction model, receiving an artificial tomogram from the prediction model, wherein the artificial tomogram represents the layer $S_j$ in the field of view, and outputting the artificial tomogram.

5. The method of embodiment 3 or 4, wherein an odd number n of tomograms T1, . . . , Tn are generated according to the following rules:

(i) Tomograms having odd-numbered indices 1, 3, . . . , n are generated before tomograms having even-numbered indices 2, 4, . . . , (n–1).

(ii) Generation of the tomograms of the two outermost layers in the order T1, Tn or Tn, T1.

(iii) Identification of a gap having the greatest distance between two scanned layers, wherein the gap is a region between two scanned layers in which yet unscanned layers are situated. If there are multiple gaps having the same distance, what is calculated for each of these gaps is the sum of the identification numbers of the scanned layers delimiting the gap. That gap in which the sum of the identification numbers is the greatest is chosen. If there are two or more of such gaps having the same greatest identification numbers, what is chosen is that gap which has the greatest distance from the last-scanned layer. If there are multiple gaps having a greatest distance from the last-scanned layer, what is selected from the relevant gaps is that gap which has the greatest distance from the layer which has immediately before the last-scanned layer (and so on).

(iv) Generation of the tomogram of that layer in a gap that best leads to halving of the gap. If there are two or more of these layers, what is chosen is that layer which has the greatest distance from the last-scanned layer.

wherein rule (i) takes precedence over all the other rules, and wherein rule (ii) takes precedence over rules (iii) and (iv), and wherein rule (iii) takes precedence over rule (iv).

6. The method of any one of embodiments 1 to 5, wherein the prediction model comprises a first artificial neural network, the generator G, and a second artificial neural network, the discriminator D, during training.

7. The method of any one of embodiments 1 to 6, wherein the prediction model comprises a first artificial neural network, the generator G, for prediction, wherein the prediction model does not comprise a second artificial neural network, the discriminator D.

8. A method for training a prediction model, comprising the steps of:

receiving a training data set, wherein the training data set comprises a plurality of reference tomograms for each reference object of a multiplicity of reference objects, wherein the reference tomograms represent a field of view of the reference object after the administration of a contrast agent, wherein the reference tomograms comprise at least three tomograms for each reference object: a first reference tomogram, a second reference tomogram and a third reference tomogram, wherein the first reference tomogram represents a first layer within the field of view, wherein the second reference tomogram represents a second layer within the field of view, wherein the third reference tomogram represents a third layer within the field of view, wherein the third layer in the field of view lies between the first layer and the second layer, wherein the third reference tomogram has been generated after the first reference tomogram and the second reference tomogram, training the prediction model, wherein the first, the second and the third reference tomogram are fed to the prediction model, wherein the prediction model is trained to transfer contrast enhancement from the first and the second reference tomogram to the third reference tomogram and to generate an artificial tomogram which represents the third layer.

9. A method for training a prediction model, comprising the steps of:

receiving a training data set, wherein the training data set comprises a plurality of actual reference tomograms for each reference object of a multiplicity of reference objects, wherein the reference tomograms represent a field of view of the reference object after the administration of a contrast agent, wherein the reference tomograms comprise at least three tomograms for each reference object: a first reference tomogram, a second reference tomogram and a third reference tomogram, wherein the first tomogram represents a first layer within the field of view, wherein the second tomogram represents a second layer within the field of view, wherein the third tomogram represents a third layer within the field of view, wherein the third layer in the field of view lies between the first layer and the second layer, wherein the third tomogram has been generated after the first tomogram and the second tomogram, training the prediction model, wherein the prediction model comprises two artificial neural networks for training, a first network and a second network, wherein the first network is configured to receive the first, the second and the third tomogram for each reference object and to generate an artificial tomogram on the basis of the received tomograms, wherein the artificial tomogram represents the third layer in the field of view, wherein the second network is configured to receive the third tomogram and/or the artificial tomogram and to state for the received tomogram whether the received tomogram is an actual tomogram or an artificially generated tomogram, wherein the first network and the second network are trained together in an unsupervised learning process, wherein the first network is trained to generate artificial tomograms which are not rated as artificial by the second network and the second network is trained to distinguish artificial tomograms from actual tomograms, storing at least the first network and/or supplying the first network to a method for predicting an artificial tomogram for an examination object.

10. A computer system for execution of a method for generating an artificial, contrast-enhanced tomogram according to any of embodiments 1 to 7.

11. The computer system according to embodiment 10, wherein the computer system (10) comprises a receiving unit (11), a control and calculation unit (12) and an output unit (13).

12. The computer system according to embodiment 10 or 11, wherein the control and calculation unit is configured to generate an artificial, contrast-enhanced tomogram by a method according to any of embodiments 1 to 4 from at least three actual tomograms of an examination region of an examination object that represent the examination region after administration of a contrast agent.

13. The computer program product comprising a computer program which can be loaded into a memory of a computer system, where it prompts the computer system to execute the method for generating an artificial, contrast-enhanced tomogram according to any of embodiments 1 to 7.

14. Use of a method according to any of embodiments 1 to 7 for generation of an artificial, contrast-enhanced tomogram.

15. Use of a contrast agent in a method according to any of embodiments 1 to 7 for prediction of at least one radiological image.

16. A contrast agent for use in a method according to any of embodiments 1 to 7 for prediction of at least one radiological image.

17. A kit comprising a contrast agent and a computer program product according to embodiment 13.

The invention claimed is:

1. A method for training a prediction model, comprising:

receiving a training data set, wherein the training data set comprises a plurality of reference tomograms for each reference object of a multiplicity of reference objects, wherein the reference tomograms represent a field of view of the reference object after the administration of a contrast agent, wherein the reference tomograms comprise at least two tomograms for each reference object: a first reference tomogram and a second reference tomogram, wherein the first reference tomogram represents a first layer within the field of view, wherein the second reference tomogram represents a second layer within the field of view, wherein the second reference tomogram has been generated after the first reference tomogram; and training the prediction model, wherein the first and the second reference tomogram are fed to the prediction model during training, wherein the prediction model is trained to transfer contrast enhancement from the first reference tomogram to the second reference tomogram and to generate an artificial tomogram which represents the second layer.

2. The method of claim 1, further comprising storing and/or outputting the trained prediction model and/or using the trained prediction model to predict an artificial tomogram.

3. The method of claim 1, wherein the prediction model comprises a first artificial neural network and a second artificial neural network, wherein the first network is configured to receive the first and the second tomogram for each reference object and to generate an artificial tomogram on the basis of the received tomograms, wherein the artificial tomogram represents the second layer in the field of view, wherein the second network is configured to receive the second tomogram and/or the artificial tomogram and to state for the received tomogram whether the received tomogram is an actual tomogram or an artificially generated tomogram, and wherein the first network and the second network are trained together in a supervised or unsupervised learning process, wherein the first network is trained to generate artificial tomograms which are not rated as artificial by the second network and the second network is trained to distinguish artificial tomograms from actual tomograms.

4. The method of claim 3, further comprising storing at least the first network and/or supplying the first network to a method for predicting an artificial contrast-enhanced tomogram for an examination object.

5. A method for generating an artificial, contrast-enhanced tomogram, comprising:

receiving a first tomogram, wherein the first tomogram represents a first layer within a field of view of an examination object after the administration of a contrast agent;

receiving a second tomogram, wherein the second tomogram represents a second layer within the field of view of the examination object after the administration of the contrast agent, wherein the second tomogram has been generated after the first tomogram;

providing a prediction model, wherein the prediction model has been trained on the basis of a training data set to transfer contrast information from at least one tomogram to another tomogram and to generate an artificial tomogram in the process;

feeding the first and second tomogram to the prediction model;

receiving an artificial tomogram from the prediction model, wherein the artificial tomogram represents the second layer in the field of view, wherein contrast information from the first tomogram has been transferred in the artificial tomogram; and outputting the artificial tomogram.

6. The method of claim 5, wherein the prediction model has been trained on the basis of the training data to transfer contrast information from at least two tomograms to one tomogram and to generate the artificial tomogram in the process, the method further comprising:

receiving a third tomogram, wherein the third tomogram represents a third layer within the field of view of the examination object after the administration of the contrast agent, wherein the third layer lies between the first and the second layer, wherein the third tomogram is generated after the first and the second tomogram, feeding the first, second and third tomogram to the prediction model, receiving second artificial tomogram from the prediction model, wherein the second artificial tomogram represents the third layer in the field of view, wherein contrast information from the first and the second tomogram has been transferred in the artificial tomogram, and outputting the second artificial tomogram.

7. The method of claim 6, wherein providing the prediction model comprises:

receiving the training data set, wherein the training data set comprises a plurality of reference tomograms for each reference object of a multiplicity of reference objects, wherein the reference tomograms represent a field of view of the reference object after the administration of a contrast agent, wherein the reference tomograms comprise at least three tomograms for each reference object: a first reference tomogram, a second reference tomogram and a third reference tomogram, wherein the first reference tomogram represents a first layer within the field of view, wherein the second reference tomogram represents a second layer within the field of view, wherein the third reference tomogram represents a third layer within the field of view, wherein the third layer in the field of view lies between the first layer and the second layer, wherein the third reference tomogram has been generated after the first reference tomogram and the second reference tomogram, training the prediction model, wherein the first, the second, and the third reference tomogram are fed to the prediction model, wherein the prediction model is trained to transfer contrast enhancement from the first and the second reference tomogram to the third reference tomogram and to generate an artificial tomogram which represents the third layer.

8. The method of claim 7, wherein, during training, the prediction model comprises a first artificial neural network and a second artificial neural network, wherein the first network is configured to receive the first, the second and the third tomogram for each reference object and to generate an artificial tomogram on the basis of the received tomograms, wherein the artificial tomogram represents the third layer in the field of view, wherein the second network is configured to receive the third tomogram and/or the artificial tomogram and to state for the received tomogram whether the received tomogram is an actual tomogram or an artificially generated tomogram, wherein the first network and the second network are/have been trained together in an unsupervised learning process, wherein the first network is/has been trained to generate artificial tomograms which are not rated as artificial by the second network and the second network is/has been trained to distinguish artificial tomograms from actual tomograms, and wherein the artificial tomogram is predicted using the first network.

9. The method of claim 5, comprising:

receiving a number n of tomograms T1, . . . , Tn, wherein n is a whole odd number greater than 2, wherein each tomogram T1, . . . , Tn respectively represents a layer S1, . . . , Sn within a field of view of an examination object after the administration of a contrast agent, wherein the layers S1, . . . , Sn are arranged parallel to one another in a spatial sequence, wherein the spatial sequence is specified by the indices 1, . . . , n, wherein the tomograms have been generated in an order in which the tomograms $T2k+1$ are generated first of all and then the tomograms $T2k$, wherein k is an index which passes through the values from 0 to $(n-1)/2$, providing the prediction model, wherein the prediction model has been trained on the basis of a training data set to transfer contrast information from respectively two immediately neighboring tomograms which have been generated at an earlier time to tomograms which have been generated at a later time to generate an artificial, contrast-enhanced tomogram in the process, feeding the received tomograms to the prediction model, receiving a number $(n-1)/2$ of artificial tomograms KT, wherein each artificial tomogram $KT_{2i+1}$ represents the respective layer $S_{2i+1}$ and has been generated on the basis of the tomograms $T_{2i}$ and $T_{2i+2}$, wherein i is an index which can assume the numbers from 0 to k, and outputting at least one of the artificial tomograms.

10. The method of claim 5, comprising:

generating an odd number n of tomograms T1, . . . , Tn, wherein the tomograms are generated according to the following rules:

(i) Tomograms having odd-numbered indices 1, 3, . . . , n are generated before tomograms having even-numbered indices 2, 4, . . . , (n–1), (ii) Generation of the tomograms of the two outermost layers in the order T1, Tn or Tn, T1, (iii) Identification of a gap having the greatest distance between two scanned layers, wherein the gap is a region between two scanned layers in which yet unscanned layers are situated, If there are multiple gaps having the same distance, what is calculated for each of these gaps is the sum of the identification numbers of the scanned layers delimiting the gap, that gap in which the sum of the identification numbers is the greatest is chosen, If there are two or more of such gaps having the same greatest identification numbers, what is chosen is that gap which has the greatest distance from the last-scanned layer, If there are multiple gaps having a greatest distance from the last-scanned layer, what is selected from the relevant gaps is that gap which has the greatest distance from the layer which has immediately before the last-scanned layer (and so on), (iv) Generation of the tomogram of that layer in a gap that best leads to halving of the gap, If there are two or more of these layers, what is chosen is that layer which has the greatest distance from the last-scanned layer, wherein rule (i) takes precedence over all the other rules, and wherein rule (ii) takes precedence over rules (iii) and (iv), and wherein rule (iii) takes precedence over rule (iv).

11. A computer system comprising:

a receiving unit, a control and calculation unit, and an output unit, wherein the control and calculation unit is configured to prompt the receiving unit to receive at least a first and a second tomogram, wherein the first tomogram represents a first layer within a field of view of an examination object after the administration of a contrast agent, wherein the second tomogram represents a second layer within the field of view of the examination object after the administration of the contrast agent, wherein the second tomogram has been generated after the first tomogram, wherein the control and calculation unit is configured to feed the first and the second tomogram to a prediction model, wherein the prediction model has been trained on the basis of a training data set to transfer contrast information from at least one tomogram to another tomogram and to generate an artificial tomogram in the process, wherein the control and calculation unit is configured to receive an artificial tomogram from the prediction model, wherein the artificial tomogram represents the second layer in the field of view, wherein contrast information from the first tomogram has been transferred in the artificial tomogram, and wherein the control and calculation unit is configured to prompt the output unit to output the artificial tomogram.

12. The computer system of claim 11, wherein the control and calculation unit is configured to prompt the receiving unit to receive at least a first, a second and a third tomogram, wherein the first tomogram represents a first layer within a field of view of an examination object after the administration of a contrast agent, wherein the second tomogram represents a second layer within the field of view of the examination object after the administration of the contrast agent, wherein the third tomogram represents a third layer within the field of view of the examination object after the administration of the contrast agent, wherein the third layer lies between the first and the second layer, wherein the third tomogram is generated after the first and the second tomogram, wherein the control and calculation unit is configured to feed the first, the second and the third tomogram to a prediction model, wherein the prediction model has been trained on the basis of a training data set to transfer contrast information from at least two tomograms to one tomogram and to generate an artificial tomogram in the process, wherein the control and calculation unit is configured to receive an artificial tomogram from the prediction model, wherein the artificial tomogram represents the third layer in the field of view, wherein contrast information from the first and the second tomogram has been transferred in the artificial tomogram, and wherein the control and calculation unit is configured to prompt the output unit to output the artificial tomogram.

13. A non-transitory computer readable storage medium storing instructions that, when executed by one or more processors of a computer system, cause the computer system to:

receive a first tomogram, wherein the first tomogram represents a first layer within a field of view of an examination object after the administration of a contrast agent, receive a second tomogram, wherein the second tomogram represents a second layer within the field of view of the examination object after the administration of the contrast agent, wherein the second tomogram has been generated after the first tomogram, feed the first and second tomogram to a prediction model, wherein the prediction model has been trained on the basis of a training data set to transfer contrast information from at least one tomogram to another tomogram and to generate an artificial tomogram in the process, receive an artificial tomogram from the prediction model, wherein the artificial tomogram represents the second layer in the field of view, wherein contrast information from the first tomogram has been transferred in the artificial tomogram, and output the artificial tomogram.

14. The non-transitory computer readable storage medium of claim 13, wherein the instructions cause the computer system to:

receive a third tomogram, wherein the third tomogram represents a third layer within the field of view of the examination object after the administration of the contrast agent, wherein the third layer lies between the first and the second layer, wherein the third tomogram is generated after the first and the second tomogram, feed the first, second and third tomogram to the prediction model, wherein the prediction model has been trained on the basis of a training data set to transfer contrast information from at least two tomograms to one tomogram and to generate an artificial tomogram in the process, receive a second artificial tomogram from the prediction model, wherein the second artificial tomogram represents the third layer in the field of view, wherein contrast information from the first and the second tomogram has been transferred in the artificial tomogram, and output the second artificial tomogram.

15. A method comprising:

using a contrast agent to predict an artificial contrast-enhanced tomogram, wherein predicting the artificial contrast-enhanced tomogram comprises:

generating a first tomogram, wherein the first tomogram represents a first layer within a field of view of an examination object after the administration of a contrast agent, generating a second tomogram, wherein the second tomogram represents a second layer within the field of view of the examination object after the administration of the contrast agent, wherein the second tomogram is generated after the first tomogram, feeding the first and second tomogram to a prediction model, wherein the prediction model has been trained on the basis of a training data set to transfer contrast information from at least one tomogram to another tomogram and to generate an artificial tomogram in the process, receiving an artificial tomogram from the prediction model, wherein the artificial tomogram represents the second layer in the field of view, wherein contrast information from the first tomogram has been transferred in the artificial tomogram, and outputting the artificial tomogram.

16. The method of claim 15, wherein predicting the artificial contrast-enhanced tomogram further comprises:

generating a third tomogram, wherein the third tomogram represents a third layer within the field of view of the examination object after the administration of the contrast agent, wherein the third layer lies between the first and the second layer, wherein the third tomogram is generated after the first and the second tomogram, feeding the first, second and third tomogram to the prediction model, wherein the prediction model has been trained on the basis of a training data set to transfer contrast information from at least two tomograms to one tomogram and to generate an artificial tomogram in the process, receiving a second artificial tomogram from the prediction model, wherein the second artificial tomogram represents the third layer in the field of view, wherein contrast information from the first and the second tomogram has been transferred in the artificial tomogram, and outputting the second artificial tomogram.

17. A contrast agent for use in a method for predicting an artificial contrast-enhanced tomogram, wherein the method comprises the following steps:

generating a first tomogram, wherein the first tomogram represents a first layer within a field of view of an examination object after the administration of a contrast agent, generating a second tomogram, wherein the second tomogram represents a second layer within the field of view of the examination object after the administration of the contrast agent, wherein the second tomogram is generated after the first tomogram, feeding the first and second tomogram to a prediction model, wherein the prediction model has been trained on the basis of a training data set to transfer contrast information from at least one tomogram to another tomogram and to generate an artificial tomogram in the process, receiving an artificial tomogram from the prediction model, wherein the artificial tomogram represents the second layer in the field of view, wherein contrast information from the first tomogram has been transferred in the artificial tomogram, and outputting the artificial tomogram.

18. The contrast agent of claim 17, wherein the method for predicting an artificial contrast-enhanced tomogram comprises:

generating a third tomogram, wherein the third tomogram represents a third layer within the field of view of the examination object after the administration of the contrast agent, wherein the third layer lies between the first and the second layer, wherein the third tomogram is generated after the first and the second tomogram, feeding the first, second and third tomogram to a prediction model, wherein the prediction model has been trained on the basis of a training data set to transfer contrast information from at least two tomograms to one tomogram and to generate an artificial tomogram in the process, receiving a second artificial tomogram from the prediction model, wherein the artificial tomogram represents the third layer in the field of view, wherein contrast information from the first and the second tomogram has been transferred in the artificial tomogram, and outputting the artificial tomogram.

* * * * *